United States Patent [19]
Durheim

[11] Patent Number: 6,070,813
[45] Date of Patent: Jun. 6, 2000

[54] LASER DRILLED NOZZLE IN A TIP OF A FUEL INJECTOR

[75] Inventor: Brent Durheim, Peoria, Ill.

[73] Assignee: Caterpillar Inc., Peoria, Ill.

[21] Appl. No.: 09/132,420

[22] Filed: Aug. 11, 1998

[51] Int. Cl.[7] .................................................. F02M 59/00
[52] U.S. Cl. ........................................................ 239/533.2
[58] Field of Search ......................................... 239/533.2

[56] References Cited

U.S. PATENT DOCUMENTS

| | | | |
|---|---|---|---|
| 3,805,015 | 4/1974 | Herziger et al. | 219/121 L |
| 4,220,842 | 9/1980 | Sturmer et al. | 219/121 LM |
| 4,857,696 | 8/1989 | Taeusch et al. | 219/121.7 |
| 4,896,944 | 1/1990 | Irwin et al. | 350/247 |
| 5,093,548 | 3/1992 | Schmidt-Hebbel . | |
| 5,126,532 | 6/1992 | Inagawa et al. | 219/121.7 |
| 5,140,127 | 8/1992 | Stroud et al. | 219/121.71 |
| 5,166,493 | 11/1992 | Inagawa et al. | 219/121.71 |
| 5,182,188 | 1/1993 | Cole, Jr. et al. | 430/323 |
| 5,222,617 | 6/1993 | Gregory et al. | 219/121.71 |
| 5,237,148 | 8/1993 | Aoki et al. | 219/121.7 |
| 5,498,851 | 3/1996 | Hayashi et al. | 219/121.7 |

FOREIGN PATENT DOCUMENTS

| | | |
|---|---|---|
| 2755386 | 9/1996 | France . |
| 0299143 | 3/1988 | Germany . |
| 2 318 538 | 10/1996 | United Kingdom . |
| 2328894 | 9/1997 | United Kingdom . |

*Primary Examiner*—Robert M. Fetsuga
*Attorney, Agent, or Firm*—Maginot, Addison & Moore

[57] ABSTRACT

A fuel injector housing having a main body portion and a tip portion is disclosed. The main body portion has a chamber defined therein in which fuel injector components may be positioned. The tip portion has a nozzle defined therein. The nozzle has a passageway extending therethrough which is in fluid communication with the chamber. The nozzle is prepared by a process including the step of focusing a laser beam so that its focal point is located substantially on an outer surface of the tip portion for a first period of time sufficient to create the passageway whereby the nozzle is formed and a waste product is deposited at a periphery of the passageway. The process further includes the step of creating a first prepassageway which extends though the tip portion of the housing, the first prepassageway defining a first substantially cylindrically-shaped channel having a first diameter. The process still further includes the step of creating a second prepassageway which extends though the tip portion of the housing, the second prepassageway defining a second substantially cylindrically-shaped channel having a second diameter which is greater than the first diameter. The process yet further includes the step of refocusing the laser beam so that its focal point is located above the outer surface for a second period of time sufficient to disintegrate the waste product.

20 Claims, 5 Drawing Sheets

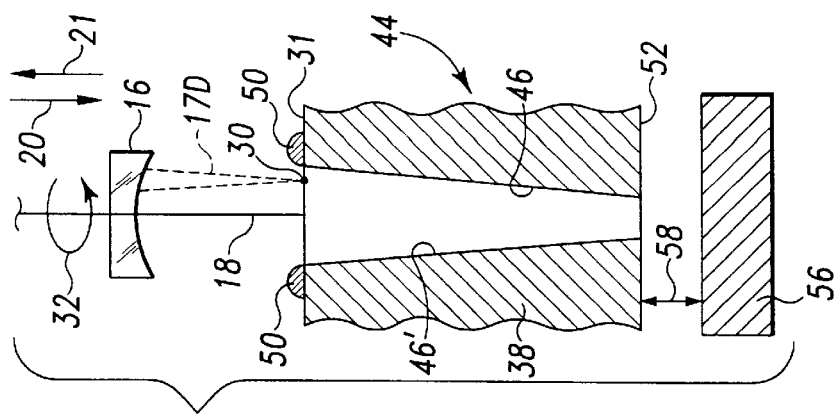
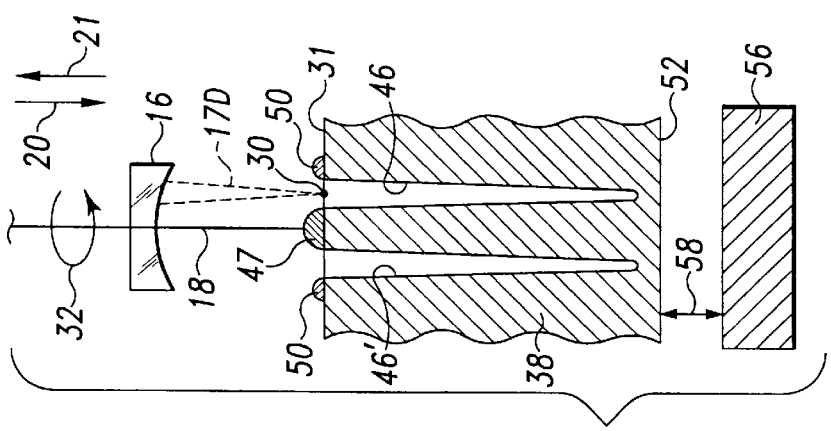
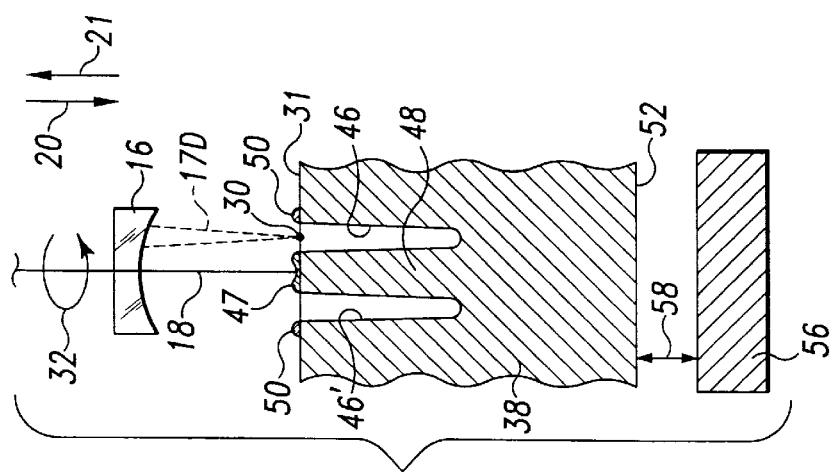

LASER DRILLED NOZZLE IN A TIP OF A FUEL INJECTOR

TECHNICAL FIELD OF THE INVENTION

The present invention relates generally to a nozzle in a tip of a fuel injector, and more specifically to a laser drilled nozzle in a tip of a fuel injector.

BACKGROUND OF THE INVENTION

A fuel injector is used to inject fuel into a combustion chamber of a diesel engine. A tip of the fuel injector has a number of small nozzles defined therein. Pressurized fuel is advanced from the fuel injector, through the nozzles and into the combustion chamber of the diesel engine. These nozzles must be formed so that a precise amount of fuel is advanced through the fuel injector tip into the combustion chamber. This precise metering allows the fuel to be evenly distributed in the combustion chamber.

Wire electric discharge machining (WEDM) has been used to form nozzles in the tip of the fuel injector. WEDM directs an electrical charge through the material in the tip of the fuel injector to form a hole in the tip of the fuel injector. WEDM produces small straight holes which are ideal for use as nozzles. However, a drawback of using WEDM is that WEDM can only form nozzles with a diameter greater than approximately 150 microns. In addition, the WEDM process takes a relatively long time to form a nozzle in the tip of the fuel injector.

Electronic engine controls rapidly adjust the amount of fuel injected into the combustion chamber via the fuel injector. In order to increase the speed that the fuel as it is injected into the combustion chamber, the pressure of the fuel must be increased. To increase the pressure of the fuel, the diameter of the nozzle must correspondingly be decreased. The fuel pressures currently being used require nozzles with diameters smaller than the minimum diameter that can be produced using WEDM.

Laser drilling can produce a nozzle with a smaller diameter than nozzles produces with WEDM. The beam of a laser can be focused on a precise area of the tip of the fuel injector to produce very small holes, on the order of twenty microns in diameter. In fact, the focused laser beam can produce a hole with a diameter much smaller than the diameter required for the nozzle in the tip of the fuel injector.

A process known as trepanning, or circular interpolation drilling, can be used to produce a hole with a diameter larger than the diameter of the focused laser beam. In the trepanning process, the laser beam is moved along the perimeter of a circle or other shape. Moving the laser beam around the perimeter of the circle forms a nozzle with the diameter equal to the diameter of the circle. The trepanning process allows a nozzle with a diameter of approximately one hundred and fifty microns to be formed with a focused laser beam that produces holes with a diameter of approximately twenty microns.

However, a drawback to using the trepanning process is that a waste product, known as slag or dross, is deposited around an outer surface of the nozzle as the nozzle is formed. As the laser beam cuts through the material in the tip of the fuel injector, the waste product, consisting of molten metal and other impurities, is deposited around the periphery of the nozzle. During operation of the diesel engine, the deposited waste product disturbs the flow of fuel being advanced through the nozzle into the combustion chamber. Disturbance of the flow of fuel causes an uneven distribution of the fuel in the combustion chamber which can degrade performance of the diesel engine.

What is needed therefore is an apparatus and method for laser drilling a nozzle in the tip of a fuel injector which overcomes one or more of the above-mentioned drawbacks.

DISCLOSURE OF THE INVENTION

In accordance with a first embodiment of the present invention, there is provided a fuel injector housing. The fuel injector housing includes a main body portion having a chamber defined therein in which fuel injector components may be positioned. The fuel injector housing further includes a tip portion having a nozzle defined therein. The nozzle has a passageway extending therethrough which is in fluid communication with the chamber. The nozzle is prepared by a process including the step of focusing a laser beam so that its focal point is located substantially on an outer surface of the tip portion for a first period of time sufficient to create the passageway whereby the nozzle is formed and a waste product is deposited at a periphery of the passageway. The process further includes the step of refocusing the laser beam so that its focal point is located above the outer surface for a second period of time sufficient to disintegrate the waste product.

In accordance with a second embodiment of the present invention, there is provided a fuel injector housing. The fuel injector housing includes a main body portion having a chamber defined therein in which fuel injector components may be positioned. The fuel injector housing further includes a tip portion having a nozzle defined therein. The nozzle has a passageway extending therethrough which is in fluid communication with the chamber. The nozzle is prepared by a process including the step of focusing a laser beam so that its focal point is located substantially on an outer surface of the tip portion for a first period of time sufficient to create the passageway whereby the nozzle is formed and a waste product is deposited at a periphery of the passageway. The process further includes the step of moving the laser beam in a rotating path of movement so as to create the passageway in the tip portion. The process still further includes the step of refocusing the laser beam so that its focal point is located above the outer surface for a second period of time sufficient to disintegrate the waste product. The process yet further includes the step of moving the laser beam in a rotating path of movement so as to disintegrate the waste product around the entire periphery of the passageway.

In accordance with a third embodiment of the present invention, there is provided a fuel injector housing. The fuel injector housing includes a main body portion having a chamber defined therein in which fuel injector components may be positioned. The fuel injector housing further includes a tip portion having a nozzle defined therein. The nozzle has a passageway extending therethrough which is in fluid communication with the chamber. The nozzle is prepared by a process including the step of focusing a laser beam so that its focal point is located substantially on an outer surface of the tip portion for a first period of time sufficient to create the passageway whereby the nozzle is formed and a waste product is deposited at a periphery of the passageway. The process further includes the step of creating a first prepassageway which extends though the tip portion of the housing, the first prepassageway defining a first substantially cylindrically-shaped channel having a first diameter. The process still further includes the step of creating a second prepassageway which extends though the tip portion of the housing, the second prepassageway defining a second substantially cylindrically-shaped channel having a second diameter which is greater than the first diameter. The process yet further includes the step of refocusing the laser beam so that its focal point is located above the outer surface for a second period of time sufficient to disintegrate the waste product.

BRIEF DESCRIPTION OF THE DRAWINGS

FIG. 2A is a cross section of the tip portion of the fuel injector housing after approximately one tenth of a second of applying the laser of FIG. 1 using a first laser drilling process;

FIG. 2B is a view similar to FIG. 2A, but showing the tip portion after approximately three tenths of a second;

FIG. 2C is a view similar to FIG. 2A, but showing the tip portion after approximately five seconds;

BEST MODE FOR CARRYING OUT THE INVENTION

Figures 1A, 1B:
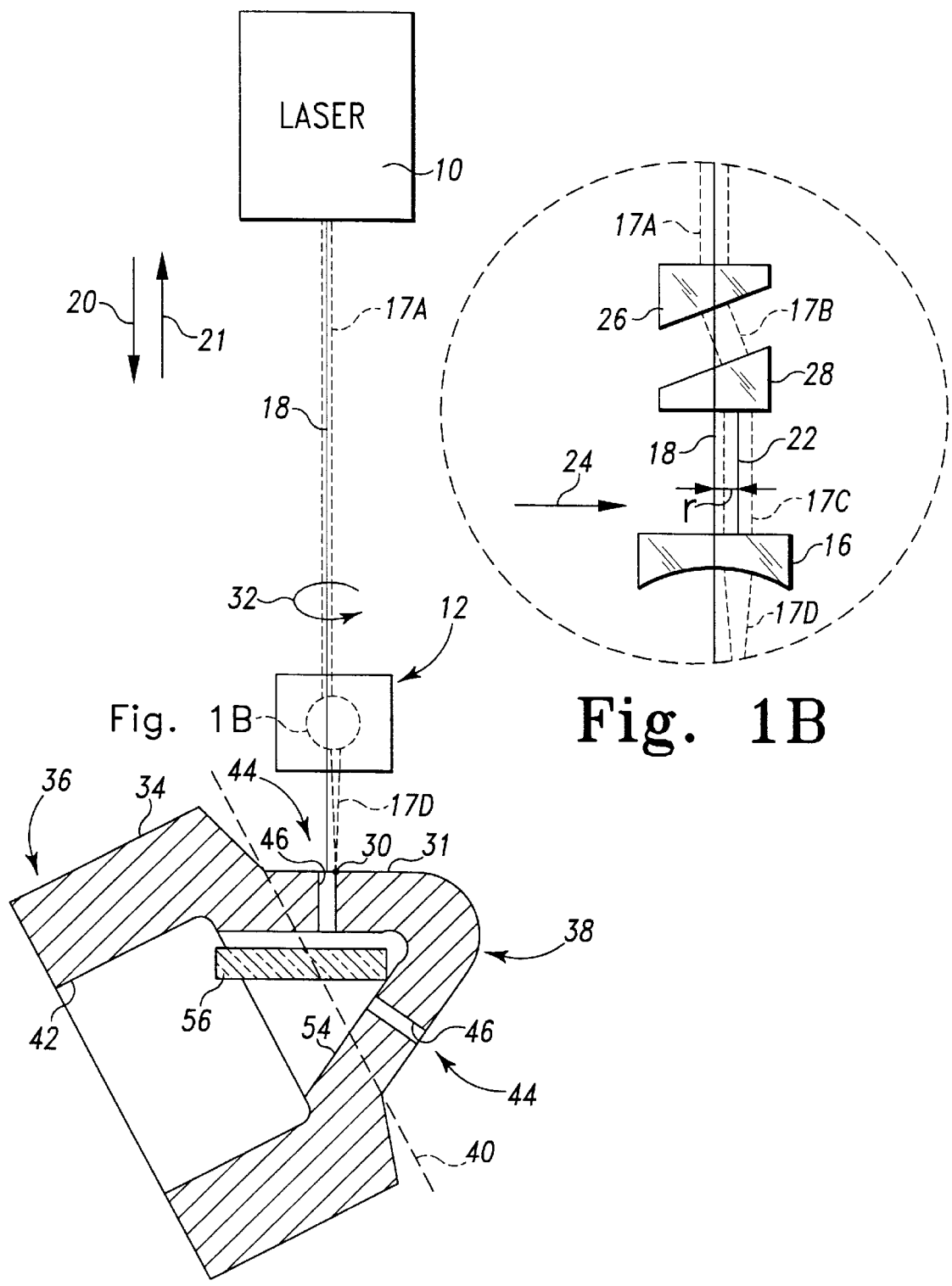
FIG. 1A is a cross sectional view of a fuel injector housing with a schematic view of a laser and optics which incorporates the features of the present invention therein.
FIG. 1B is an enlarged view of the optics of FIG. 1A.

While the invention is susceptible to various modifications and alternative forms, two specific embodiments thereof has been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIGS. 1A and 1B, there is shown a laser 10 which is operable to advance a laser beam 17A in the general direction of arrow 20 along an axis 18. The laser 10 is a copper vapor laser, commercially available from Oxford Lasers Ltd. of Abingdon, UK as model no. LM250. The laser 17A beam advances from the laser 10 toward a set of trepanning optics 12.

The trepanning optics 12, also commercially available from Laser Mechanisms of Farmington Hills, Mich. as wedge boring head delivery system, are operable to offset the laser beam 17A from the axis 18 a distance in the general direction of arrow 24. In particular, the trepanning optics 12 include a first wedge 26 which receives the laser beam 17A projected from the laser 10 along the axis 18 and transmits the laser beam 17A as laser beam 17B in the general direction of arrow 24. The trepanning optics 24 further include a second wedge 28. The second wedge 28 receives the laser beam 17B and transmits the laser beam 17B as laser beam 17C along a line 22 in the general direction of arrow 20. Note that the line 22 is spaced apart from the axis 18 a distance equal to an offset radius r in the general direction of arrow 24. It should be appreciated that upon leaving the second wedge 28, the laser beam 17C is traveling along the line 22 which is substantially parallel to the axis 18, but is offset from the axis 18 a distance equal to the offset radius r in the general direction of arrow 24.

The trepanning optics 12 are further operable to focus the laser beam 17C on a focal point 30. It should be appreciated that the laser beam 17A exiting the laser 10 is a coherent beam. What is meant herein by the term "coherent" is that each portion of the laser beam 17A is traveling in the same direction, the direction indicated by arrow 20. The coherency of the laser beam 17A is not affected by either the first wedge 26 or the second wedge 28. Thus, the laser beam 17C which exits the second wedge 28 is also a coherent beam. In order to concentrate the energy of the laser beam 17C, a lens 16 receives the laser beam 17C and focuses the laser beam 17C as laser beam 17D on the focal point 30. The lens 16 is further operable to move the focal point 30 up or down in the general direction of arrows 20 and 21.

The trepanning optics 12 are yet further operable to rotate the focused laser beam 17D along a rotating path of movement. In particular, the trepanning optics 12 rotate about the axis 18 in the general direction of arrow 32. It should be appreciated that rotation of the trepanning optics 12 about the axis 18, causes the focused laser beam 17D to move along a circular path. This circular path is centered on the axis 18 and has a radius equal to the offset radius r.

A fuel injector housing 34 is divided into a main body portion 36 and a tip portion 38 by a dotted line 40. The main body portion 36 has a chamber 42 defined therein. The chamber 42 contains a number of fuel injector components (not shown). These components include a fuel inlet that admits a fuel from a fuel supply into the chamber 42, a piston which pressurizes the fuel in the chamber 42, a check valve that selectively advances the pressurized fuel from the chamber 42 to the tip portion 38, and a solenoid which is operative to receive control signals from an engine control unit to position the injector valve.

The laser 10 and trepanning optics 12 are used to form a passageway 46 in a fuel injector housing 34. Each passageway 46 and the surrounding portion for the housing 34 forms a nozzle 44. It should be appreciated that the focal point 30 is located on or near an outer surface 31 of the tip portion 38. It should further be appreciated that energy of the focused beam 17D at the focal point 30 advantageously vaporizes the metal of the tip portion 38.

The nozzle 44 is formed by advancing the laser beam 17D so as to create a passageway 46 through the tip portion 38 of the fuel injector housing 34. Note that FIG. 1 shows a cross section with a nozzle 44 on a lower portion of the tip section 38, and a second nozzle 44 being formed in the tip portion 38 by focusing the laser beam 17D on the focal point 30. Each of the nozzles 44 are in fluid communication with the chamber 42 such that pressurized fuel from the chamber 42 can be advanced through the passageway 46 of each of the nozzles 44 into the combustion chamber of the diesel engine during operation thereof.

Figure 2E:
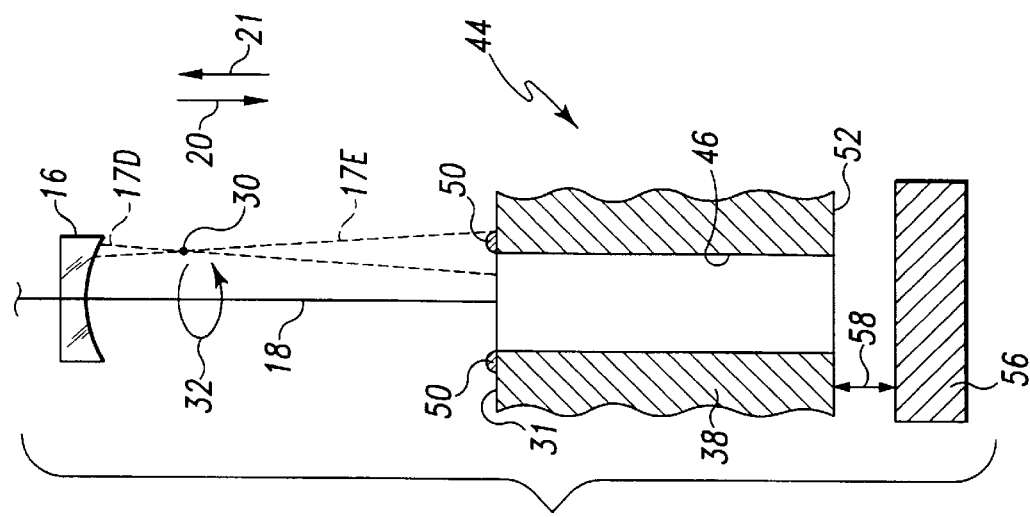
FIG. 2E is a view similar to FIG. 2A, but showing the laser beam refocused above the outer surface of the tip portion for an additional one to two seconds.

Referring now to FIGS. 2A through 2E, there is shown a first laser drilling process. FIG. 2A shows the first one tenth of a second of the first drilling process. The laser 10 and the trepanning optics 12 advance the focused laser beam 17D on the focal point 30 located on or near the outer surface 31 of the tip portion 38. The tip portion 38 is approximately 0.8 to 1.3 millimeters thick where the nozzle 44 is to be formed. As the laser beam 17D is focused on the tip portion 38, a passageway 46 is formed as metal in the tip portion 38 is vaporized.

It should be appreciated that the laser beam 17D is being rotated around the axis 18 by the trepanning optics 12 in the general direction of arrow 32 so as to follow the rotating path of motion. As the laser beam 17D follows the rotating path of motion, a circular passageway is formed. The passageway 46 is the portion of the circular passageway that is formed when the laser beam 17D is positioned as shown in FIG. 2A whereas the passageway 46' is formed when the laser beam 17D is rotated 180 degrees about the axis 18 from the position shown in FIG. 2A. The passageway 46 and 46' form a circular channel around a core section 48.

The trepanning optics 12 are used because the width of the passageway 46 is approximately twenty microns whereas the desired final width of the final passageway is approximately one hundred and fifty microns. Thus, in order to form the nozzle 44 with a final passageway having a width of one hundred and fifty microns, the laser beam 17D must be moved along a circular path. It should be appreciated that the final width of the passageway through the nozzle 44 and the offset radius r are related in the following manner:

$$W = 2r + w_p$$

where W is the width of the final passageway, r is the offset radius of the laser beam 17C from the axis 18, and $w_p$ is the width of the passageway 46 that is formed by the focused laser beam 17D in the tip portion 38. Thus, to produce a nozzle 44 having a final passageway having a width W of one hundred and fifty microns with a laser beam 17D that produced a passageway 46 with a width $w_p$ of twenty microns, the offset radius r must be set at sixty-five microns.

As the laser beam 17D advances into the tip portion 38, the metal in the passageway 46 is disintegrated. Some of the disintegrated material is vaporized and is carried away from the nozzle 44. Another portion of the disintegrated material is melted and forced upward in the general direction of arrow 21. This material is then deposited as a waste product 50 on the outer surface 31 of the tip portion 38 or as a waste product 47 deposited on the outer surface of the core 48.

Referring now to FIG. 2B, there is shown the first laser drilling process after three tenths of a second. The passageway 46 has advanced approximately ninety percent of the distance through the tip portion 38. It should be noted that as the depth of the passageway 46 increases in the general direction of arrow 20, the amount of the waste product 50 deposited on the outer surface 31 of the tip portion 38 increases. Similarly, the amount of the waste product 47 deposited on the outer surface of the core 48 increases.

Referring now to FIG. 2C, there is shown the first laser drilling process after approximately five seconds. The passageways 46 and 46' have penetrated an interior surface 52 of the tip portion 38 such that the laser beam 17C is advanced through the tip portion 38. It should be appreciated that once the passageway 46 and 46' pass through the tip portion 38, the core 48 is no longer supported by the tip portion 38. Thus, the core 48 drops away from the tip portion 38 in the direction of arrow 20 or is vaporized by the laser beam 17D.

Without the core 48 positioned in the passageway 46, as the laser beam 17D removes material, a portion of the waste product is advanced in the general direction of arrow 20. This portion of the waste product is not deposited on the outer surface 31 of the tip portion 38 as the waste product 50.

The nozzle 44 is formed as the passageway 46 has penetrated the tip portion 38. However, the shape of the passageway 46 is conical. What is meant herein by the term "conical" is that the diameter of the passageway 46 is larger at the outer surface 31 than the diameter of the passageway 46 at the interior surface 52. In order to advance the correct amount of fuel from the chamber 42 through the nozzle 44, it is desirable that the passageway 46 of the nozzle 44 has a cylindrical shape, i.e. the diameter of the passageway 46 at the outer surface 31 has the same diameter as the passageway 46 at the interior surface 52. While the passageway 46 is herein described as being cylindrical in shape and has significant advantages thereby in the present invention, it should be appreciated that numerous other configurations of the passageway 46 are also contemplated. For example, the passageway 46 may be a tapered cylinder or non-cylindrical shape such as a square-shaped passage.

In order to produce a passageway 46 with a cylindrical shape, the laser beam 17D must be focused on the focal point 30 for an additional period of time. However, since the laser beam 17D has penetrated the tip portion 38, any additional advancement of laser beam 17A from the laser 10 will cause the laser beam 17D to pass through the tip portion 38 and impinge an untargeted interior surface 54 (shown in FIG. 1) on the opposite side of the tip portion 38. If the laser beam 17D impinges on the untargeted interior surface 54, material on the untargeted interior surface 54 could either be removed or otherwise affected by the laser beam 17D. If material is removed at the untargeted interior surface 54, the flow of fuel in the tip portion 38 could be altered. Any alteration of flow of fuel in the tip portion 38 could alter the flow of fuel from the from the chamber 42, through the nozzle 44, and into the combustion chamber. Additionally, the application of the laser beam 17D to the untargeted interior surface 54 may cause a heat affected zone in the tip portion 38 around the untargeted interior surface 54. A heat affected zone can limit the strength and life of the tip portion 38.

To prevent the laser beam 17D from passing through the tip portion 38 and impinging on the untargeted interior surface 54, a backing material 56 is interposed between the interior surface 52 and the untargeted interior surface 54. The backing material 56 is suitably a 0.5 mm thick block of one of the following group of materials: tungsten, tungsten carbide, ceramics, or other high temperature material. These backing materials have the ability to absorb a large amount of laser energy from the laser beam 17D without disintegrating. Moreover, tungsten is relatively inexpensive when compared to other materials with similar laser resistant properties.

An additional feature of the backing material 56 is that the backing material 56 is separated from the interior surface 52 of the tip portion 38 by an air gap 58 of approximately 0.5 mm. The air gap 58 prevents heat from being conducted from the tip portion 38 to the backing material 56. The air gap 58 also allows the laser beam 17D to diverge, or increase in diameter, thereby reducing the power density of the beam that strikes the backing material 56. In addition, the gap 58 allows convective air currents to cool the backing material 56 and dissipate some of the heat generated as the laser beam 17D strikes the backing material 56.

Figure 2D:
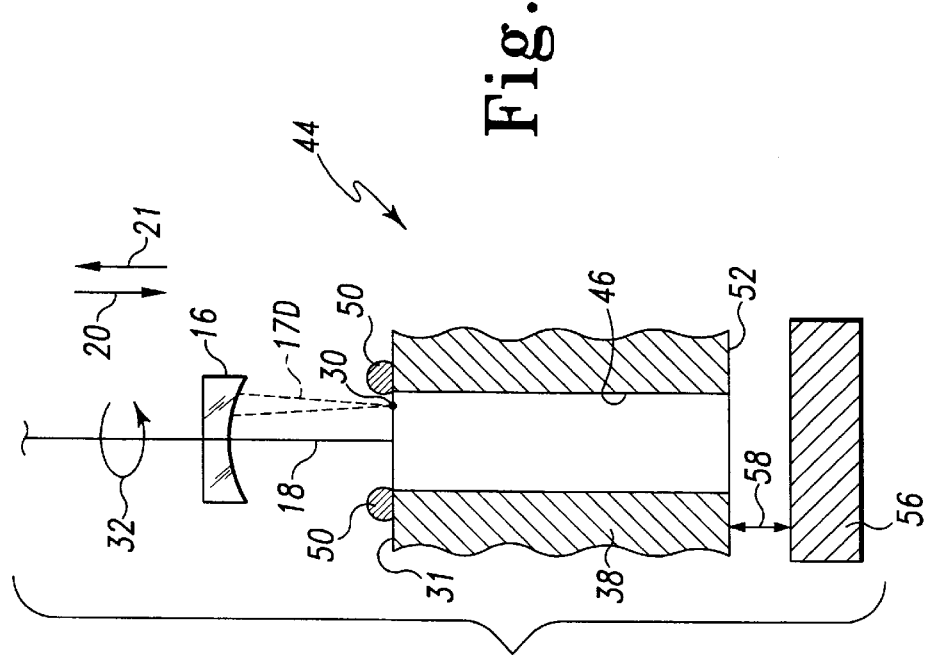
FIG. 2D is a view similar to FIG. 2A, but showing the tip portion after approximately ten to twenty seconds.

Referring now to FIG. 2D, there is shown the first laser drilling process after approximately ten to twenty seconds. The passageway 46 is now cylindrically shaped with the diameter of the passageway 46 at the outer surface 31 being substantially identical to the diameter of the passageway 46 at the lower surface 52.

The shape of the passageway 46 is a function of the distance between the lens 16 and the focal point 30 located on the outer surface 31 of the tip portion 38. The shape of the passageway 46 is related to the f number F/#. The f number F/# is calculated using the following equation:

$$F/\# = \frac{l_f}{d_B}$$

where $l_f$ is the focal length of the lens 16 and $d_B$ is the beam diameter entering the lens 16. The focal length $l_f$ is the distance between the lens 16 and the focal point 30. The beam diameter $d_B$ is the diameter of he laser beam 17C that enters the lens 16. For this laser drilling process, it was found that a f number F/# between five and ten forms the nozzles 44 with a passageway 46 having a cylindrical shape. A f numberF/# of seven forms the passageway 46 having the best cylindrical shape. A f number F/# of less than 5 produces a tapered cylinder with a smaller diameter on the outer surface 31 than on the lower surface 52. Conversely, a f number F/# of greater than 10 produces a tapered cylinder with a larger diameter on the outer surface 31 than on the lower surface 52.

Referring now to FIG. 2E, there is shown the first laser drilling process during the final one to two seconds. Because the waste product 50 on the outer surface 31 may impede or otherwise degrade the flow of fuel through the nozzle 44, it is desirable to remove the waste product 50 from the outer surface 31 of the tip portion 38. The laser beam 17D is refocused such that the focal point 30 is moved approximately two to five millimeters in the general direction of arrow 21 by adjusting the lens 16. Thus, an unfocused laser beam 17E strikes the outer surface 31 of the tip portion 38. It should be appreciated that the unfocused laser beam 17E is spread over a larger area then the laser beam 17D thus decreasing the intensity of the laser beam 17E. This unfocused laser beam 17E is applied to the outer surface 31 of the tip portion 38 for approximately one to two seconds. It should further be appreciated that the rotation of the trepanning optics 12 around the axis 18 in the general direction of arrow 32 causes the unfocused laser beam 17E to rotate around the entire periphery of the passageway 46 on the outer surface 31 so as to remove the waste product 50.

The advancement of this unfocused laser beam 17E is advantageously configured in both power and duration so as to disintegrate the waste product 50 which accumulated on the outer surface 31 during formation of the nozzle 44. The advancement of the unfocused laser beam 17E is further advantageously configured in power and duration so as not to effect the outer surface 31 of the tip portion 38 when the waste product 50 is being disintegrated. Furthermore, as the laser beam 17E passes through the tip portion 38, the blocking material 56 prevents the laser beam 17E from impinging on the untargeted interior surface 54. Because the focal point 30 has been moved away from the outer surface 31 of the tip portion 38, the intensity of the laser beam 17E is less than the intensity of the laser beam 17D used to form the nozzle 44. Therefore, the laser beam 17E advances less laser energy to the backing material 56 than the laser beam 17D.

It should be appreciated that the first laser drilling process includes operating the laser 10 in two distinct modes of operation. In the first mode of operation shown in FIGS. 2A through 2D, the laser 10 advances the laser beam 17A for a first period of time, approximately ten to twenty seconds, to form the passageway 46 of the nozzle 44 by focusing the laser beam 17D at the outer surface 31 of the tip portion 38. In the second mode of operation, the laser 10 advances the laser beam 17A for a second period of time, approximately one to two seconds, to remove the waste product 50 on the outer surface 31. The waste product 50 is removed with the unfocused laser beam 17E created by refocusing the laser beam 17D a distance above the outer surface 31 of the tip portion 38.

Referring now to FIGS. 3A through 3E, there is shown a second laser drilling process. The second process is somewhat similar to the first process shown in FIGS. 2A through 2E. The laser 10, the trepanning optics 12, and the injector housing 34 are substantially identical those used in the first process. Thus, the same reference numerals are used in FIGS. 3A through 3E to designate common elements which were previously discussed in regard to FIGS. 1 through 2E.

Figure 3C:
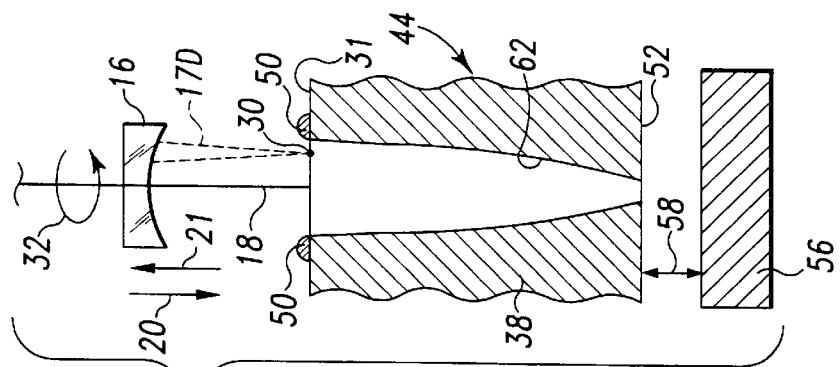
FIG. 3C is a view similar to FIG. 3A, but showing the tip portion after approximately five seconds.
Figure 3B:
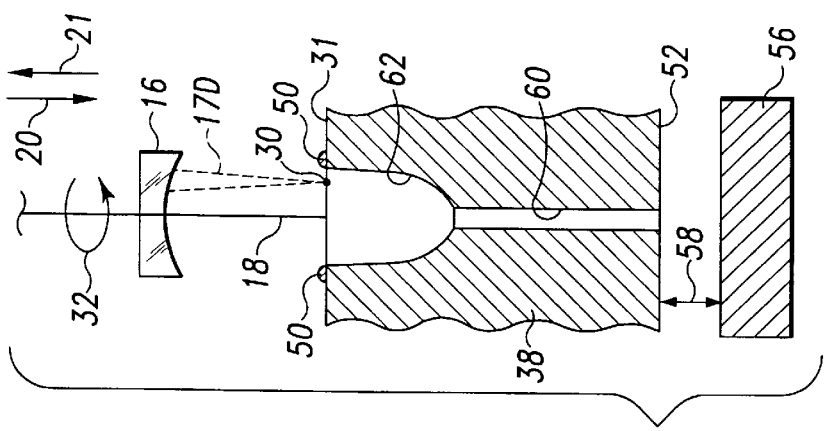
FIG. 3B is a view similar to FIG. 3A, but showing the tip portion after approximately one to three seconds.
Figure 3A:
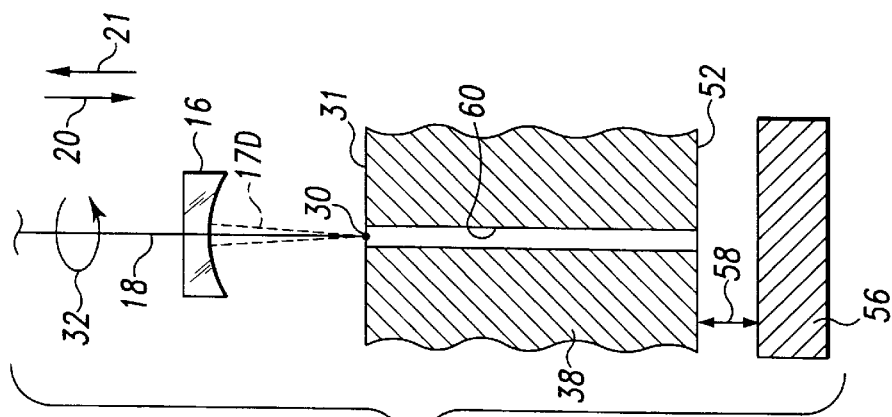
FIG. 3A is a cross section of the tip portion of the fuel injector housing after approximately one half to two seconds of applying the laser of FIG. 1 using a second laser drilling process.

FIG. 3A shows, the first one half to two seconds of the second drilling process whereby the laser beam 17D is focused on the focal point 30 to create a first prepassageway 60. In particular, the first prepassageway 60 can either be formed using a percussion drilling method (shown in FIG. 3A) or the trepanning drilling method. If the percussion drilling method is used, the offset radius r is set to 0.0 mm such that the laser beam 17D is colinear with the axis 18. Thus, the laser beam 17D is focused on a single point and is not moved in a rotating path of movement. A rapid succession of pulses of the laser beam 17D creates a very narrow first prepassageway 60 as shown in FIG. 3A. The first prepassageway 60 is a substantially cylindrical passageway that connects the outer surface 31 to the interior surface 52.

Alternately, the first prepassageway 60 can be formed by setting the offset radius r to a distance substantially smaller than the offset radius r required to form the nozzle 44. As the focused laser beam 17D is moved in the rotating path of motion, the first prepassageway 60 is formed without creating a significant amount of waste product 50 on the outer surface 31 of the tip portion 38.

Referring now to FIG. 3B, there is shown the second laser drilling process after approximately one to three seconds of advancing the laser beam 17D. The trepanning optics 12 have been adjusted so that a second prepassageway 62 is created by setting the offset radius r to the distance required to form the nozzle 44. The second prepassageway 62 is equivalent to the first passageway 46 of the first laser drilling process. The second laser drilling process forms the nozzle 44 by creating two prepassageways, the first prepassageway 60 and the second prepassageway 62. However, three or more prepassageways could be drilled to form the nozzle 44, each prepassageway being larger than the previous prepassageway.

Note, that because the first prepassageway 60 is formed, a lesser amount of the waste product 50 is deposited on the outer surface 31 of the tip portion 38 than was deposited with the first drilling process. There are two reasons that a lesser amount of the waste product 50 is deposited on the outer surface 31 with the second process than is deposited with the first drilling process. First, a portion of the waste product created by forming the second prepassageway 62 can advance through the first prepassageway 60 in the general direction of arrow 20. This portion of the waste product is not deposited on the outer surface 31 of the tip portion 38 as the waste product 50. In addition, because an amount of material of the tip portion 38 was removed by forming the first prepassageway 60, less material is converted into the waste product during the formation of the second prepassageway 62.

Similar to the first laser drilling process, the tip portion 38 is penetrated by forming the first prepassageway 60 after approximately one half to two seconds. Any additional advancement of the laser beam 17D will pass through the tip portion 38 and impinge on the untargeted interior surface 54 (shown in FIG. 1) on the opposite side of the tip portion 38. In a manner similar to the first laser drilling method, the backing material 56 is interposed between the interior surface 52 and the untargeted interior surface 54. The backing material 56 is separated from the interior surface 52 of the tip portion 38 by an air gap 58 of approximately 0.5 mm. The air gap 58 prevents heat from being conducted from the tip portion 38 to the backing material 56. In addition, the gap 58 allows convective air currents to cool the backing material 56 and dissipate some of the heat that is generated as the laser beam 17C strikes the backing material 56.

Referring now to FIG. 3C, there is shown the second laser drilling process after approximately five seconds. The second prepassageway 62 is nearing the point where the second prepassageway 62 will penetrate the interior surface 52 of the tip portion 38. It should be appreciated that a substantially lesser amount of waste product 50 is deposited on outer surface 31 using the second laser drilling process (shown in FIG. 3C) than was deposited on the outer surface 31 by using the first drilling process after approximately five seconds (shown in FIG. 2C).

As the second prepassageway 62 first forms the nozzle 44, the second prepassageway 62 is conical. In order to produce a nozzle 44 with a cylindrical second prepassageway 46, the laser beam 17D must be focused on the focal point 30 for an additional period of time.

Figure 3E:
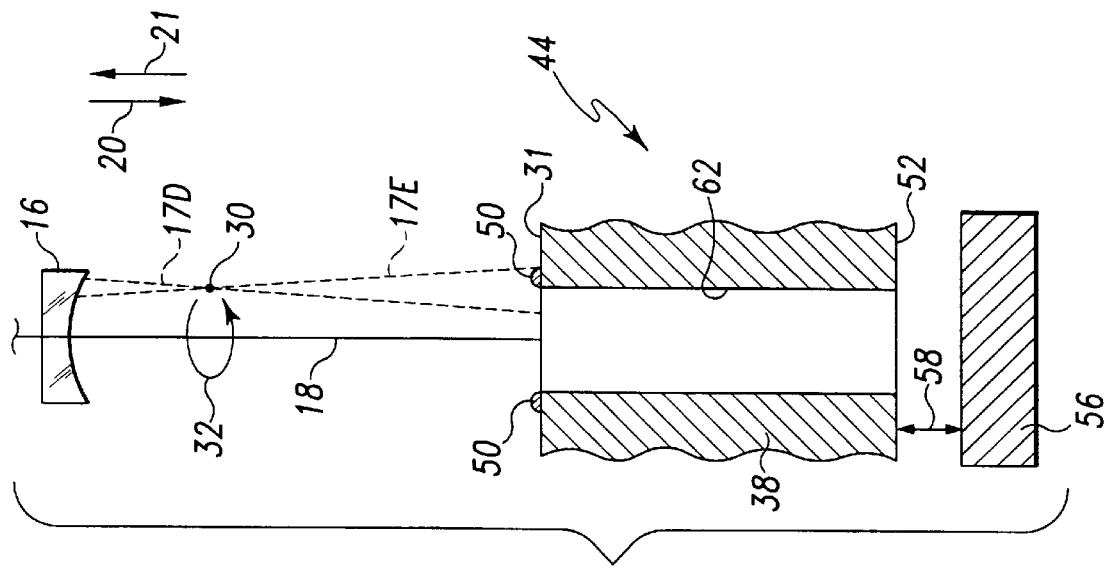
FIG. 3E is a view similar to FIG. 3A, but showing the laser beam refocused above the outer surface of the tip portion for an additional one to two seconds.
Figure 3D:
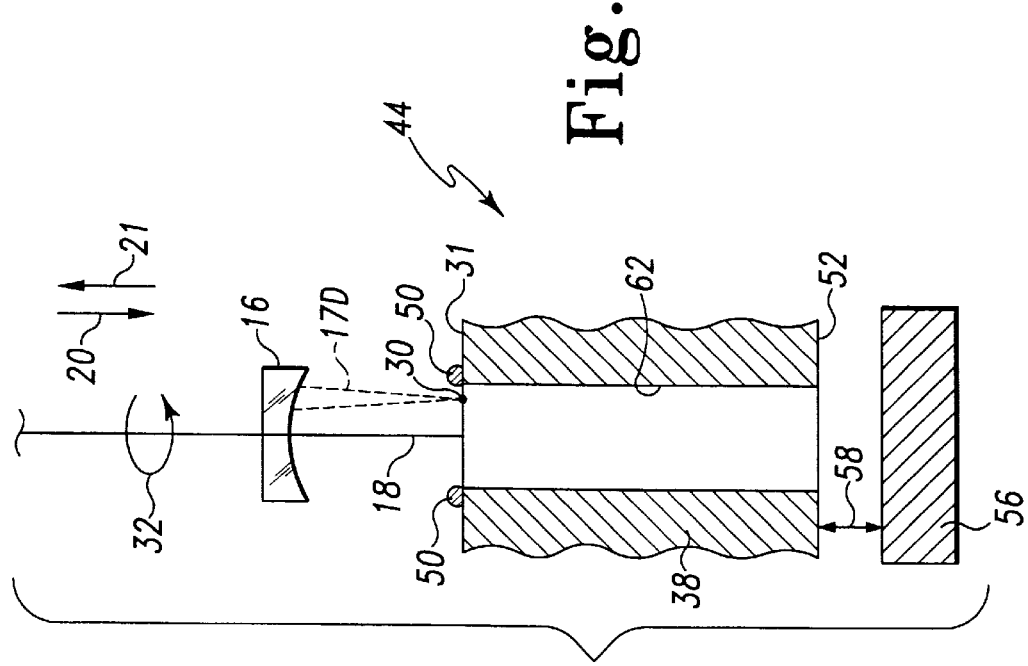
FIG. 3D is a view similar to FIG. 3A, but showing the tip portion after approximately ten to twenty seconds.

Referring now to FIG. 3D, there is shown the second laser drilling process after approximately ten to twenty seconds. The second prepassageway is now cylindrically shaped with the diameter of the second prepassageway 62 at the outer surface 31 being substantially identical to the diameter of the second prepassageway 62 at the interior surface 52. The shape of the second prepassageway 62 is a function of the f number F/# of the laser beam 17D. The lens 16 must be selected to produce a f number F/# of approximately seven in order cause the laser beam 17D to form the second prepassageway 62 with the best cylindrical shape.

Referring now to FIG. 3E, there is shown the second laser drilling process during the final one to two seconds. The laser beam 17D is refocused such that the focal point 30 is moved approximately two to five millimeters in the general direction of arrow 21. Thus, the laser beam 17E that strikes the outer surface 31 of the tip portion 38 is not focused. In a manner similar to the first laser drilling process, the advancement of this unfocused laser beam 17E is advantageously configured in power and duration so as to disintegrate the waste product 50, which has accumulated on the outer surface 31 of the tip portion 38 around the periphery of the nozzle 44 during the second laser drilling process. The advancement of this unfocused laser beam 17E is further advantageously configured in power and duration so as not to effect the outer surface 31 of the tip portion 38 when the waste product 50 is being disintegrated. Due to the formation of a lesser amount of the waste product 50 on the outer surface 31, the laser beam 17E may be advanced to disintegrate the waste product 50 for a lesser amount of time than the time required to disintegrate the waste product 50 during the first laser drilling process (shown in FIG. 2E).

It should be appreciated that the second laser drilling process includes operating the laser 10 in three distinct modes of operation. In the first mode of operation shown in FIG. 3A, the laser 10 advances the laser beam 17A for a first period of time, approximately one half to two seconds, to form the first prepassageway 60. In the second mode of operation shown in FIGS. 3B through 3D, the laser 10 advances the laser beam 17A for a second period of time, approximately ten to twenty seconds, to form the second prepassageway 62 with the focused laser beam 17D. In the third mode of operation, the laser 10 advances the laser beam 17A for a third period of time, approximately one to two seconds, to remove the waste product 50 deposited on the outer surface 31. The waste product 50 is removed with the unfocused laser beam 17E created by refocusing the laser beam 17D a distance above the outer surface 31 of the tip portion 38.

It should be appreciated that both the first laser drilling process and the second laser drilling process are similar, but each has its respective advantages and disadvantages. The first laser drilling process has the advantage of not requiring that the offset radius r be adjusted during formation of the nozzle 44. However, the first drilling process has the disadvantage depositing more of the waste product 50 on the outer surface 31 of the tip portion 38 during the formation of the passageway 46. The second laser drilling process has the advantage of reducing the amount of the waste product 50 deposited during formation of the nozzle 44. However, the second laser drilling process has the disadvantage of requiring that the offset radius be adjusted at least once during the formation of the nozzle 44.

Industrial Applicability

In operation, a fuel injector housing 34 is positioned proximate to the laser 10 to form the first of a number of nozzles 44 in the tip portion 38 of the fuel injector housing 34. The laser 10 is aligned with the axis 18 in order to advance the laser beam 17A toward the trepanning optics 12.

The lens 16 is chosen such that the f number F/# of the beam 17D is equal to about seven. Also, the beam 17D is focused on the focal point 30 on or near the outer surface 31. Therefore, the distance between the focusing lens 16 and the focal point 30 is about seven times the diameter of the laser beam 17C entering the lens 16.

Using the first laser drilling process, the offset radius r between the axis 18 and the laser beam 17D is set to an offset radius r that will rotate the laser beam 17D along a circular path that will form a passage 46 with the desired final diameter.

During the first drilling process, the laser 10 advances a laser beam 17A in the general direction of arrow 20 through the trepanning optics 12. The trepanning optics 12 redirects the laser beam 17C through the lens 16 and toward the focal point 30 as laser beam 17D. The trepanning optics 12 further rotate the laser beam 17D about the axis 18 in the general direction of arrow 32. The laser beam 17A is advanced for approximately ten to twenty seconds to form a cylindrical passageway 46 through the tip portion 38.

During the first laser drilling process, the backing material 56 acts to prevent the laser beam 17D from passing through the tip portion 38 and impinging on the untargeted interior surface 54. The air gap 58 prevents heat transfer from the tip portion 38 to the backing material 56. The air gap 58 also allows the laser beam 17D to diverge, or increase in diameter, thereby reducing the power density of the beam that strikes the backing material 56. Additionally, the air gap 58 helps to dissipate some of the heat generated when the laser beam 17D strikes the backing material 56.

As material in the tip portion 38 is disintegrated to form the nozzle 44, the waste product 50 is deposited on the outer surface 31 of the tip portion 38. To remove the waste product 50, the focal point 30 of the laser beam is moved to a point two to five millimeters above the outer surface 31 of the tip portion 38, in order to defocus the laser beam 17E before it is advanced to the outer surface 31 of the tip portion 38. The laser beam 17E is then applied to the tip portion 38 for an additional one to two seconds so as to disintegrate the waste product 50 from the outer surface 31 of the tip portion 38 without damaging the outer surface 31.

In order to form a subsequent passageway 46 in the tip portion 38, the fuel injector housing 34 must be repositioned such that each of the locations for a passageway 46 is aligned with the focal point 30 of the lens 16. In addition, the backing material 56 should be replaced if formation of a previous passageway 46 has damaged the backing material 56 to the extent that the backing material 56 is unable to block the laser beam 17D and protect the untargeted interior surface 54.

Alternately, using the second laser drilling process, the offset distance r between the axis 18 and the laser beam 17C is set to zero or a distance much less than the desired radius of the nozzle 44. The laser 10 is activated for approximately one half to two seconds to form the first prepassageway 60 through the tip portion 38. Thereafter, the offset radius r is set to a value larger than the diameter of the first prepassageway 60 to form a second prepassageway 62.

Forming the first prepassageway 60 has the advantage of allowing a portion of the waste product to be advanced through the first prepassageway 60 rather than being deposited on the outer surface 31 as the waste product 50. In a manner similar to the first laser drilling process, the focal point 30 of the laser beam 17D is moved to a point two to five millimeters above the outer surface 31 of the tip portion 38 in order to create an unfocused laser beam 17E which is advanced to the outer surface 31 of the tip portion 38. The unfocused laser beam 17E is then applied to the tip portion 38 for an additional one to two seconds so as to disintegrate the waste product 50 on the outer surface 31 of the tip portion 38 without damaging the outer surface 31 of the tip portion 38.

In order to form a subsequent first prepassageway 60 and second prepassageway 62 in the tip portion 38, the fuel injector housing 34 must be repositioned such that each of the locations for the first prepassageway 60 and the second prepassageway 62 is aligned with the focal point 30 of the lens 16. In addition, the backing material 56 should be replaced if formation of a previous first prepassageway 60 and second prepassageway 62 damaged the backing material 56 to the extent that the backing material 56 is unable to block the laser beam 17D and protect the untargeted interior surface 54.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. A method of forming a fuel injector housing which includes (i) a main body portion having a chamber defined therein in which fuel injector components may be positioned and (ii) a tip portion having a nozzle defined therein, wherein said nozzle has a passageway extending therethrough which is in fluid communication with said chamber, comprising the steps of: (a) focusing a laser beam so that its focal point is located substantially on an outer surface of said tip portion for a first period of time sufficient to create said passageway whereby said nozzle is formed and a waste product is deposited at a periphery of said passageway, and (b) refocusing said laser beam so that its focal point is located above said outer surface for a second period of time sufficient to disintegrate said waste product.

2. The method of claim 1, wherein:
   said focusing step includes the step of moving said laser beam in a rotating path of movement so as to create said passageway in said tip portion.

3. The method of claim 1, wherein:
   said refocusing step includes the step of moving said laser beam in a rotating path of movement so as to disintegrate said waste product around the entire periphery of said passageway.

4. The method of claim 1, wherein said focusing step includes the steps of:
   creating a first prepassageway which extends though said tip portion of said housing, said first prepassageway defining a first substantially cylindrically-shaped channel having a first diameter; and
   creating a second prepassageway which extends though said t ip portion of said housing, said second prepassageway defining a second substantially cylindrically-shaped channel having a second diameter which is greater than said first diameter.

5. The method of claim 4, wherein:
   said first prepassageway creating step includes the step of moving said laser beam in a rotating path of movement so as to create said first prepassageway in said tip portion, and
   said second prepassageway creating step includes the step of moving said laser beam in a rotating path of movement so as to create said second prepassageway in said tip portion.

6. The method of claim 1, wherein said focusing step includes the steps of:
   locating a backing material adjacent an interior surface of said tip portion,
   advancing said laser beam against said tip portion so as to cause said laser beam to penetrate through said tip portion and strike said backing material whereby impingement of said laser beam against an untargeted interior surface of said fuel injector housing is prevented.

7. The method of claim 6, wherein said backing material is selected from the group consisting essentially of (i) tungsten, (ii) tungsten carbide, and (iii) ceramics.

8. The method of claim 6, wherein said laser beam advancing step includes the step of:
   maintaining a gap between said backing material and said interior surface of said tip portion during advancement of said laser beam against said tip portion.

9. A method of forming a fuel injector housing which includes (i) a main body portion having a chamber defined therein in which fuel injector components may be positioned and (ii) a tip portion having a nozzle defined therein, wherein said nozzle has a passageway extending therethrough which is in fluid communication with said chamber, comprising the steps of: (a) focusing a laser beam so that its focal point is located substantially on an outer surface of said tip portion for a first period of time sufficient to create said passageway whereby said nozzle is formed and a waste product is deposited at a periphery of said passageway, (b) moving said laser beam in a rotating path of movement so as to create said passageway in said tip portion, (c) refocusing said laser beam so that its focal point is located above said outer surface for a second period of time sufficient to disintegrate said waste product, and (d) moving said laser beam in a rotating path of movement so as to disintegrate said waste product around the entire periphery of said passageway.

10. The method of claim 9, wherein said focusing step includes the steps of:

creating a first prepassageway which extends though said tip portion of said housing, said first prepassageway defining a first substantially cylindrically-shaped channel having a first diameter; and creating a second prepassageway which extends though said tip portion of said housing, said second prepassageway defining a second substantially cylindrically-shaped channel having a second diameter which is greater than said first diameter.

11. The method of claim 10, wherein:

said first prepassageway creating step includes the step of moving said laser beam in a rotating path of movement so as to create said first prepassageway in said tip portion, and said second prepassageway creating step includes the step of moving said laser beam in a rotating path of movement so as to create said second prepassageway in said tip portion.

12. The method of claim 9, wherein said focusing step includes the steps of:

locating a backing material adjacent an interior surface of said tip portion, advancing said laser beam against said tip portion so as to cause said laser beam to penetrate through said tip portion and strike said backing material whereby impingement of said laser beam against an untargeted interior surface of said fuel injector housing is prevented.

13. The method of claim 12, wherein said backing material is selected from the group consisting essentially of (i) tungsten, (ii) tungsten carbide, and (iii) ceramics.

14. (Amended) The method of claim 12, wherein said laser beam advancing step includes the step of:

maintaining a gap between said backing material and said interior surface of said tip portion during advancement of said laser beam against said tip portion.

15. A method of forming a fuel injector housing which includes (i) a main body portion having a chamber defined therein in which fuel injector components may be positioned and (ii) a tip portion having a nozzle defined therein, wherein said nozzle has a passageway extending therethrough which is in fluid communication with said chamber, comprising the steps of (a) focusing a laser beam so that its focal point is located substantially on an outer surface of said tip portion for a first period of time sufficient to create said passageway whereby said nozzle is formed and a waste product is deposited at a periphery of said passageway, (b) creating a first prepassageway which extends though said tip portion of said housing, said first prepassageway defining a first substantially cylindrically-shaped channel having a first diameter, (c) creating a second prepassageway which extends though said tip portion of said housing, said second prepassageway defining a second substantially cylindrically-shaped channel having a second diameter which is greater than said first diameter, and (d) refocusing said laser beam so that its focal point is located above said outer surface for a second period of time sufficient to disintegrate said waste product.

16. The method of claim 15, wherein:

said focusing step includes the step of moving said laser beam in a rotating path of movement so as to create said passageway in said tip portion, and said refocusing step includes the step of moving said laser beam in a rotating path of movement so as to disintegrate said waste product around the entire periphery of said passageway.

17. The method of claim 16, wherein:

said first prepassageway creating step includes the step of moving said laser beam in a rotating path of movement so as to create said first prepassageway in said tip portion, and said second prepassageway creating step includes the step of moving said laser beam in a rotating path of movement so as to create said second prepassageway in said tip portion.

18. The method of claim 16, wherein said focusing step includes the steps of:

locating a backing material adjacent an interior surface of said tip portion, advancing said laser beam against said tip portion so as to cause said laser beam to penetrate through said tip portion and strike said backing material whereby impingement of said laser beam against an untargeted interior surfaces of said fuel injector housing is prevented.

19. The method of claim 18, wherein said backing material is selected from the group consisting essentially of (i) tungsten, (ii) tungsten carbide, and (iii) ceramics.

20. The method of claim 18, wherein said laser beam advancing step includes the step of:

maintaining a gap between said backing material and said interior surface of said tip portion during advancement of said laser beam against said tip portion.

* * * * *